July 9, 1963 — H. K. GRAVES — 3,096,675
PIANO ACTION
Filed Aug. 11, 1960 — 3 Sheets-Sheet 1
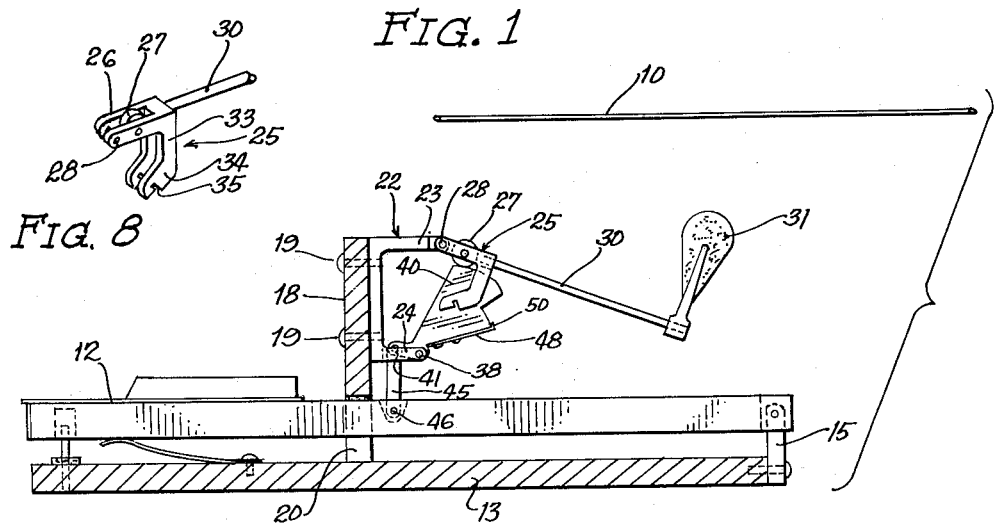
FIG. 1 / FIG. 8
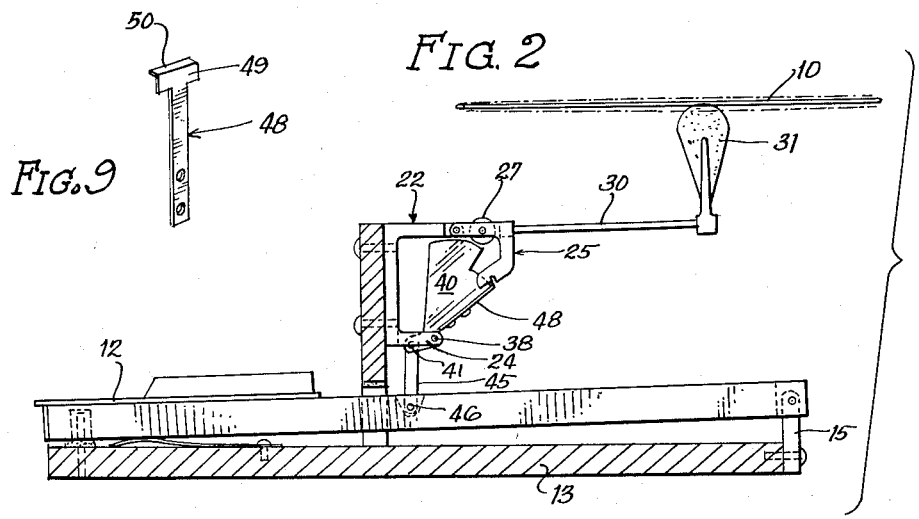
FIG. 2 / FIG. 9
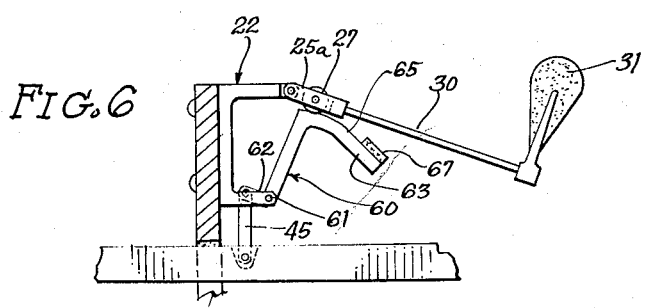
FIG. 6
INVENTOR.
Howard K. Graves
BY
Attorneys

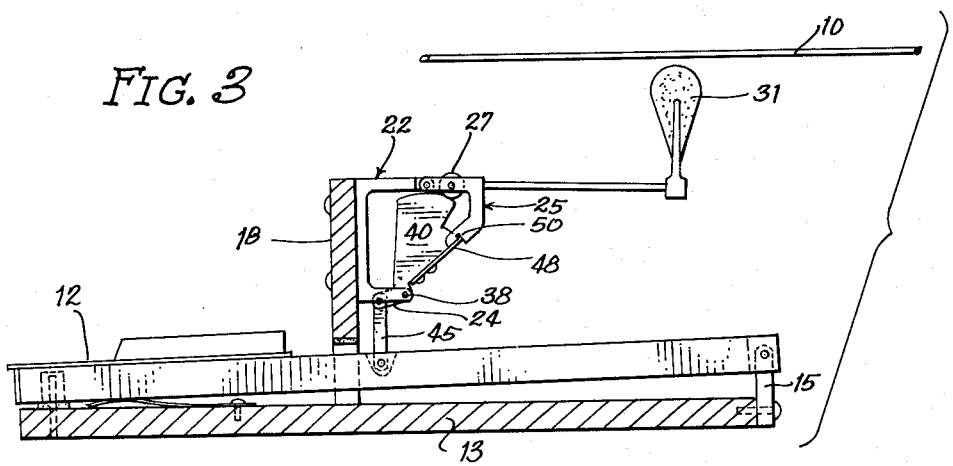
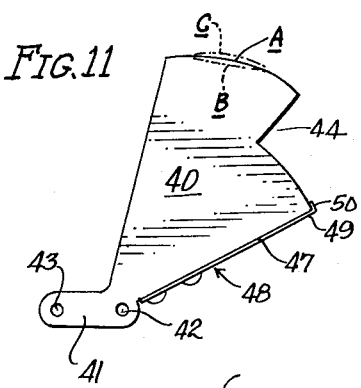
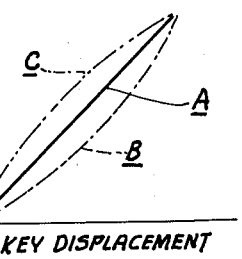
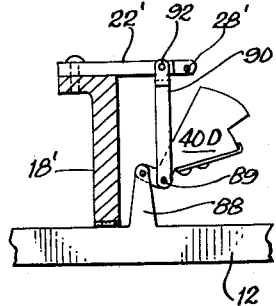
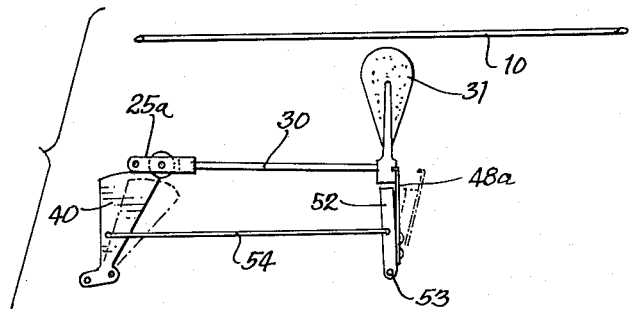

July 9, 1963  H. K. GRAVES  3,096,675
PIANO ACTION
Filed Aug. 11, 1960  3 Sheets-Sheet 3
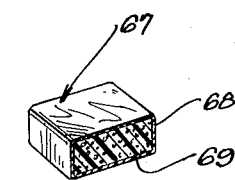
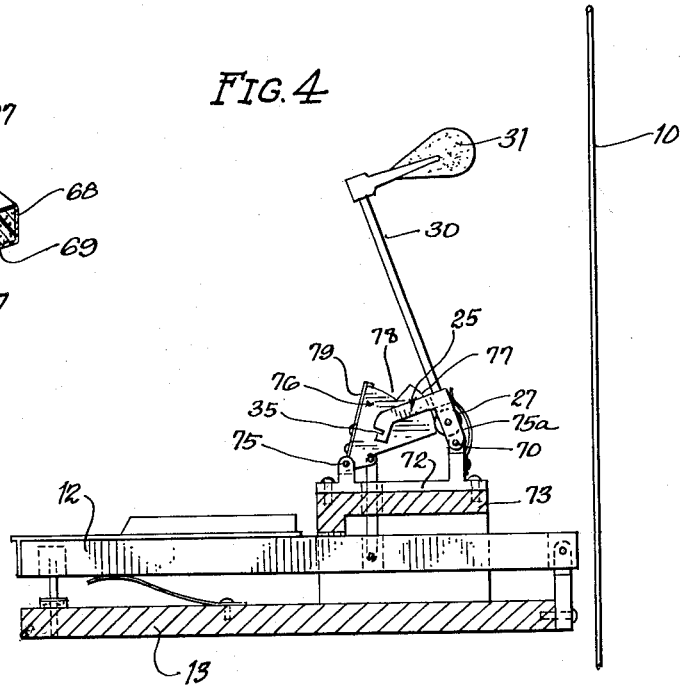
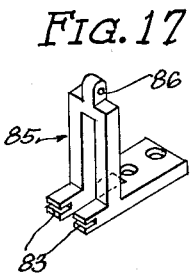
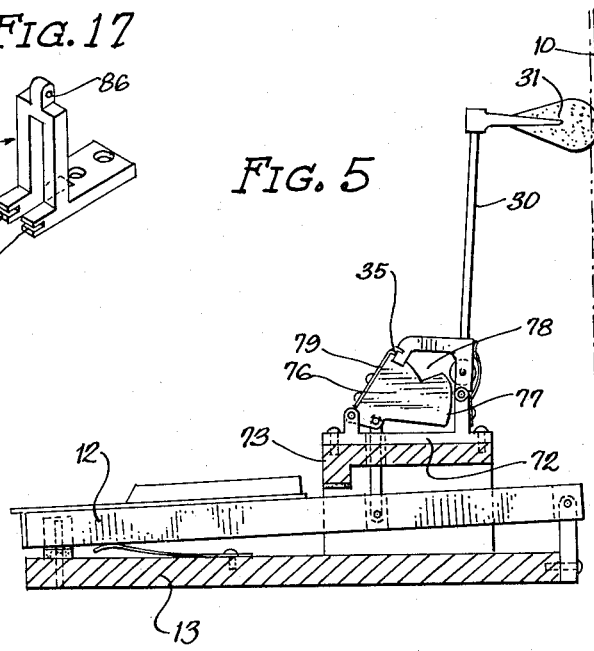
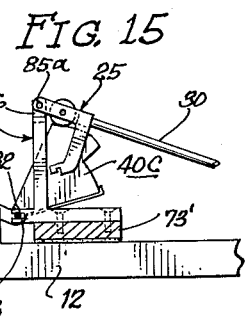
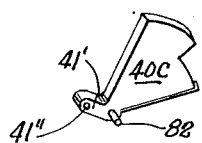
INVENTOR.
Howard K. Graves,
BY
Attorneys ல்னitedstates Patent Office 3,096,675
Patented July 9, 1963

3,096,675
PIANO ACTION
Howard K. Graves, 9241 Mango, Morton Grove, Ill.
Filed Aug. 11, 1960, Ser. No. 49,042
5 Claims. (Cl. 84—237)

My invention relates to piano actions and has as an object the provision of a new and simplified action especially designed for mass production so as to make possible a piano of high quality at a greatly reduced price as compared with pianos embodying previously known actions.

As a further object, my invention contemplates a simple cam controlled action which may be mounted in a piano frame as a unit, with the hammer, and thereafter connected with the keys by simple connecting means, with a minimum of labor, and may be maintained in proper adjusted condition with little or no attention.

My invention is suceptible of a wide variety of cam forms and arrangements, and is applicable to pianos of upright and grand types, including the so-called "console" type of piano.

A further object is to provide an action having, as a novel feature, a cam type actuator for a hammer in combination with a detent or energy absorber.

As a particular feature of my invention, I contemplate the use of a novel type of energy absorber which may be employed for the cushioning of a piano hammer on its rebound from the string, as well as a wide variety of other applications.

Various other objects and advantages will become apparent as the description proceeds.

Referring now to the drawings forming a part of this application and disclosing certain preferred embodiments of my invention, FIG. 1 is a partial cross-sectional side elevational view of a preferred embodiment of my invention showing an action in a state of rest, as applied to a grand type of piano;

FIG. 2 is a view similar to FIG. 1 but showing the piano key depressed and the hammer in striking relation to a string;

FIG. 3 is a view similar to FIG. 2 but showing the hammer in a position of rebound from the string, the key being still depressed;

FIG. 4 is a partial cross-sectional side elevational view of another embodiment of my invention, showing the action in a position of rest as applied to an upright type of piano;

FIG. 5 is a view similar to FIG. 4 but showing the key depressed and the hammer in striking relation to a string;

FIG. 6 is a side elevational view of another form of action embodying my invention in a position of rest, as applied to a grand piano;

FIG. 7 is a perspective-sectional view of an energy absorber employed in the embodiment shown in FIG. 6;

FIG. 8 is a perspective view of a hammer butt embodied in that form of my invention shown in FIGS. 1–3, inclusive;

FIG. 9 is a perspective view of a hammer-arresting member or catch embodied in certain forms of my invention;

FIG. 10 is an elevational view of another embodiment of my invention as applied to a grand type of piano, illustrating a modified catch arrangement in operative position, an alternate position being shown dotted;

FIG. 11 is a plan view on an enlarged scale of the cam forming a part of that embodiment of my invention shown in FIGS. 1–3, inclusive, indicating in dotted lines certain modifications of this type of cam for producing different effects in the hammer movement;

FIG. 12 is a chart showing graphically the variations in effect on the action by varying the cam surface as indicated in FIG. 11, hammer displacement being plotted against key displacement;

FIGS. 13–14, inclusive, are plan views of cams similar to that shown in FIGS. 1–3 and 11, with further variations in the cam surface;

FIG. 15 is a fragmentary elevation-section of another embodiment;

FIG. 16 is a perspective detail of the cam member of FIG. 15;

FIG. 17 is a perspective detail of a bracket of FIG. 15, and

FIG. 18 is a fragmentary elevation of still another embodiment.

Referring first to FIGS. 1–3, inclusive, I have shown here a form of my invention as applied to a grand type of piano, the numeral 10 indicating fragmentarily a portion of a string which may be mounted in the usual or any desired manner to the piano frame. A key 12 is pivotally mounted on key base 13 as by means of a supporting bracket 15.

Unitary support for the action is provided in the form of a board or frame 18 extending transversely of the stringing, said board 18 being attached at its ends to the piano frame and providing clearance 20 thereunder for the keys. Secured to one face of the board 18 and attached thereto as by means of screws 19 is a plurality of channel-shaped brackets 22, one for each action, having an upper leg 23 and a lower leg 24. Attached to the upper arm 23 of the channel is a hammer butt 25, seen in detail in FIG. 8.

The butt 25 may conveniently be cast of a suitable metal such as magnesium, aluminum or the like, or molded of a suitable plastic. This butt 25, in its preferred form comprises a pair of bifurcated parts such as yokes extending at approximately right angles to each other. Yoke 26, which serves to journal anti-friction roller follower 27 between the legs thereof, is pivotally attached as at 28 to the upper arm 23 of channel 22 and also is bored (bore not shown) to seat the end of hammer arm 30 carrying hammer head 31. Yoke 33 has a downwardly and rearwardly extending terminal portion 34 with a pair of alined notches 35 for a purpose which will presently appear.

Pivotally attached to lower arm 24 as at 38 is a cam member 40 seen in enlarged detail in FIG. 11. This cam member is of a general sector-like shape with an arm portion 41 bored as at 42 and 43, the bore 42 serving to seat a pin for the pivot 38 while bore 43 provides a connection with a link 45 attached to key 12 as at 46. The cam member 40 is provided with a cut-out portion as indicated at 44, and attached to the lower edge 47 of cam member 40 is a detent member 48, seen in detail in FIG. 9. This detent 48 is preferably in the form of a leaf spring attached to the edge face of cam member 40 as by screws and having a transversely elongated end portion 49 from the extremity of which a flange 50 extends transversely to the general plane of detent 48 for engagement in the notches 35 of the two legs of yoke member 33.

It will be noted from FIG. 8 that the construction is such that, in the rebound position (FIG. 3), notch 35 will be generally in line with flange 50; otherwise stated, said flange will be generally perpendicular to terminal portion 34 of yoke 33.

When a key 12, in a position of rest as seen in FIG. 1, is struck, the parts will move to positions substantially as shown in FIG. 2. There it will be seen that cam member 40 has been rotated about its pivot 38. As a result, roller 27, following the main rise portion of the cam surface seen on the left of the sector as it appears in the drawings, will have served to move the hammer first to a position slightly spaced from the string, as seen in FIG. 3, and then, by its inertia, to striking position as seen in FIG. 2, at which point the roller will be spaced away from the dwell portion of the cam surface seen at the right of the sector as it appears in the drawings. Immediately after the string has been struck, the hammer will rebound, roller 27 dropping down to rest on the dwell portion of the cam surface, notches 35 of the butt will engage flange 50 of spring detent member 48 and the parts will assume a position substantially as seen in FIG. 3.

When pressure is removed from the key 12 all of the parts will resume a position of rest as seen in FIG. 1.

It will be seen that I have provided an extremely simple, convenient and compact action arrangement which may be mounted along with the hammer mechanism as a unit on the piano action frame. After mounting the action to the action frame 18 the links 45 are attached to the cam members and to the keys respectively. It will be seen that such an arrangement provides for a minimum of labor and, accordingly, for a greatly reduced cost in piano construction.

In FIG. 10 I have shown an alternative arrangement, here again applied to a grand type of piano, in this case the catch or detent being actuated by the cam member but separate therefrom. Here I employ a cam member 40 substantially as described above, the hammer rod 30 being secured to a butt 25a, also carrying an anti-friction cam follower and pivotally mounted on a channel member 22 or the like, as seen in FIGS. 1–3. A major difference in this case from the embodiment previously described lies in the catch mechanism which comprises a spring plate 48a generally similar to that shown in FIG. 9 and attached to a bar 52 pivotally mounted to the piano frame as at 53 and rocked about said pivot by cam member 40 through link 54.

Referring to FIG. 6, I show here a modified arrangement, also for use in connection with a grand type of piano. In this case, as before, the hammer mechanism may be attached to a channel 22 or the like, employing a butt 25a, as in FIG. 10. In lieu of the sector-shaped cam member described above, I employ in this case an angular cam member 60 pivoted to the lower leg of channel 22, as at 61, a leg 62 of the cam member being pivoted to link 45 corresponding to that seen in FIGS. 1–3. Leg 63 provides a cam surface 65 which functions substantially in the same manner as cam 40 hereinabove described, with an initial rise portion and a terminal dwell. The dwell portion of leg 63, which drops away from the rise portion, carries an energy absorbing member 67 seen in detail in FIG. 7. This energy absorber, of course, receives the impact of butt 25a on rebound of the hammer from the string.

Energy absorber 67 comprises an envelope 68 preferably formed of a continuous sheet of a suitable flexible and resilient plastic material, such as a polyethylene, encasing a spongy body 69, also preferably formed of a suitable thermoplastic material such as polyurethane or the like, containing a liquid such as water, a petroleum oil, glycerine, or other liquid having similar physical characteristics, about 50–100% of the potential absorbency of the sponge being filled. The liquid-impregnated sponge, of course, is completely sealed within the envelope 68, leaving some space between sponge and envelope. I find the energy absorber 67 to be especially satisfactory, functioning more or less in the manner of a dashpot, the liquid being redistributed within the pores of the sponge and between the sponge and enveloped space, upon impact and immediately thereafter resuming the normal condition or relationship between the liquid and the sponge and the enclosing envelope.

FIGS. 4 and 5 show an application of my invention to an upright type of piano having stringing represented fragmentarily by the numeral 10 and hammers as indicated by numerals 30, 31, the hammer rod 30 being mounted in a butt 25 of substantially the same character as that seen in FIGS. 1–3. Said butt is pivoted as at 70 to a plate 72 carried by action frame 73. Supporting plate 72 also pivotally carries as at 75 a cam member 76 for each of the hammers. Cam members 76 in this instance again are of a generally sector-shaped conformation having a surface 77 which, similarly to that of cam 40 seen in FIG. 11, comprises an initial rise portion and a terminal dwell portion which drops off from the rise and also has a cut-out 78. In this case also, similarly to cam member 40, a spring detent or catch member 79 is provided which is generally similar to member 48 seen in FIG. 9.

The operation of this type of action will be readily apparent, corresponding closely to that of the action shown in FIGS. 1–3. FIG. 4 shows the parts in a position of rest, while FIG. 5 shows the parts at the time the hammer head strikes the string, after which, as in the other embodiment, the hammer, along with the cam member, will rotate counterclockwise until slot 35 engages catch member 79 upon rebound of the hammer from the string. When the key is released the catch will, of course, become disengaged and the parts will resume a position of rest as seen in FIG. 4.

It will be readily apparent to those skilled in the art that cam members employed in connection with my invention may be variously formed and may provide a wide variety of cam surfaces capable of imparting various types of motion to the hammer. Referring to FIGS. 11 and 12, it will be seen that cam surface A shown in a full line corresponding to the rise and dwell surfaces seen in FIGS. 1–3, provides a linear movement between the key and the hammer, imparted of course by the rise portion of the surface, which is the usual or normal piano action, as indicated in straight line A of FIG. 12. By reducing the radius of this rise as seen in dotted line C, or providing a greater "bulge" to the surface, the hammer will move faster at the beginning of the stroke than at the end of the stroke relative to the key movement, as indicated in the dot-dash line C in FIG. 12. On the other hand, if the rise is modified by reducing the curve as seen in the dotted line B of FIG. 11, the hammer will move faster at the end of the stroke than at the beginning thereof relative to the key, as indicated in the dot-dash line B of FIG. 12. It will be apparent that an infinite number of variations of such action may be produced as desired by modifying the configuration of the cam surface.

FIG. 13 shows another modification of the cam configuration, using a sector-type of cam 40A substantially similar to cam 40 of FIG. 11. In this case a substantially straight line dwell portion $a$ is provided at the static end or beginning of the stroke, an arcuate intermediate portion $b$ and a terminal dwell portion $c$ for the end of the stroke. It will be apparent that this type of configuration will provide a delayed movement of the hammer, the inertia of which will carry it to striking position at the end of the stroke.

In the form of cam member 40B shown in FIG. 14 I provide an initial convex arcuate portion $a'$ at the beginning and a concave relief section $b'$ at the terminal portion of the cam surface to allow the cam follower to drop below the level of the highest point on the rise to permit more rebound clearance than that provided for in the configuration shown in FIG. 11.

FIGS. 15–17 show still another arrangement for mounting a cam. I provide a sector-shaped cam member 40C substantially similar to that shown in FIG. 11 having a foot portion 41' with a pair of pintles 82 pivotally disposed in spaced slots 83 of a bifurcated L-shaped bracket 85 (FIG. 17) attached as by screws to action frame 73'. The butt 25, substantially similar to that shown in FIGS. 1–3, is pivoted as at 85a to a trunnion 86 at the upper end of bracket 85.

The cam member 40c is bored as at 41" for pivotal connection as at 87 to an actuating dog 88 fixed to key 12.

It will be seen that movement of the key will, through dog 88, rock the cam member about its pintles 82, the latter having a lost motion connection in slots 83. The action of the cam will be substantially as in the other embodiments except that it has a floating pivot rather than a fixed pivot.

The embodiment of FIG. 18 illustrates a modification of that of FIGS. 1–3. Here, cam 40d is again moved directly by key 12 through dog 88, the cam being pivoted as at 89 to a link 90, bifurcated at both ends, which in turn is pivotally connected to supporting bracket 22' fixed to action frame 18'. The butt 25, which is not shown in FIG. 8, can be pivotally mounted on bracket 22' at 28' in the same manner as shown in FIGS. 1–3.

It will be seen that here, again, the cam member has a "floating" pivot at 89 by reason of its connections to the key and bracket 22'.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A piano action comprising a base, a key pivotally mounted on said base, a hammer having an arm, said arm being pivotally connected to said base, a cam member pivotally mounted on said base and having an eccentric cam surface in engagement with said arm, and an actuating means interconnecting said key and said cam member, whereby movement of said key imparts movement to said cam member which, in turn, causes movement of said hammer by coaction of said cam surface with said arm.

2. A piano action in accordance with claim 1 wherein said cam surface engages a roller follower on said arm.

3. A piano action in accordance with claim 1 wherein said cam surface includes a rise portion and a dwell portion, said rise portion engaging said arm during the first portion of the movement of said cam member to impart sufficient momentum to said hammer so the inertia thereof will carry it against a string and said dwell portion allowing additional displacement of said cam member without affecting movement of said hammer.

4. A piano action in accordance with claim 1 including means for arresting the movement of said hammer after striking a string, said means comprising a detent member on said hammer arm and a catch member on said cam member, said detent member and said catch member being positioned relative to each other for engagement when said cam member is at substantially the extremity of its movement.

5. A piano action in accordance with claim 3 and including a detent member on said hammer arm and a resilient catch member on said cam member, said catch member being positioned relative to said detent member for engagement thereby when said cam member is at substantially the extremity of its movement to arrest movement of said hammer after it has struck a string and being disengaged from said detent member upon reverse movement of said cam member to permit said hammer to return to its rest position.

References Cited in the file of this patent

UNITED STATES PATENTS

| | | |
|---|---|---|
| 540,910 | Flynn | June 11, 1895 |
| 717,349 | Charpiat | Dec. 30, 1902 |
| 967,015 | Gilmore | Aug. 9, 1910 |
| 1,125,304 | Gilmore | Jan. 19, 1915 |
| 1,194,754 | Lanchester | Aug. 15, 1916 |
| 1,353,647 | George | Sept. 21, 1920 |
| 2,031,488 | Klein | Feb. 18, 1936 |
| 2,767,608 | Miessner | Oct. 23, 1956 |

FOREIGN PATENTS

| | | |
|---|---|---|
| 2,141,594 | Sweden | Aug. 4, 1953 |